United States Patent
Schwaderer

(10) Patent No.: US 11,947,685 B2
(45) Date of Patent: Apr. 2, 2024

(54) ALIGNED HIGH PERFORMANCE DATA ENCRYPTION METHOD

(71) Applicant: William David Schwaderer, Sparks, NV (US)

(72) Inventor: William David Schwaderer, Sparks, NV (US)

( * ) Notice: Subject to any disclaimer, the term of this patent is extended or adjusted under 35 U.S.C. 154(b) by 0 days.

(21) Appl. No.: 18/311,732

(22) Filed: May 3, 2023

(65) Prior Publication Data

US 2023/0359749 A1 Nov. 9, 2023

Related U.S. Application Data

(60) Provisional application No. 63/364,104, filed on May 3, 2022.

(51) Int. Cl.
*G06F 21/60* (2013.01)
*G06F 7/58* (2006.01)
*G06F 21/78* (2013.01)

(52) U.S. Cl.
CPC ............ *G06F 21/602* (2013.01); *G06F 7/582* (2013.01); *G06F 21/78* (2013.01)

(58) Field of Classification Search
CPC ......... G06F 21/602; G06F 21/78; G06F 7/582
See application file for complete search history.

(56) References Cited

U.S. PATENT DOCUMENTS

| | | | | |
|---|---|---|---|---|
| 2009/0013016 | A1* | 1/2009 | Noll | G06F 21/6209 |
| 2017/0351489 | A1* | 12/2017 | Iscoe | G06F 7/588 |
| 2018/0300493 | A1* | 10/2018 | Li | G06F 21/64 |
| 2020/0153613 | A1* | 5/2020 | Hale | G06F 7/586 |

OTHER PUBLICATIONS

IBM Documentation, "setvbuf()—Control Buffering", [retrieved on Sep. 26, 2023], from the Internet: https://www.ibm.com/docs/en/i/7.1?topic=functions-setvbuf-control-buffering#setvbuf (Year: 2021).*
Intel FPGA SDK for OpenCL, " 1.3.1. Processor Affinity or CPU Pinning", [retrieved on Sep. 26, 2023], from the Internet: https://www.intel.com/content/www/us/en/docs/programmable/683013/current/processor-affinity-or-cpu-pinning.html (Year: 2017).*
Wikipedia, "Data structure alignment", Jan. 2022, [retrieved on Sep. 26, 2023], from the Internet: https://en.wikipedia.org/w/index.php?title=Data_structure_alignment&oldid=1066534751 (Year: 2022).*
Rosetta Code, "Knuth shuffle", Apr. 2022, [retrieved on Sep. 28, 2023], from the Internet: https://www.rosettacode.org/wiki/Knuth_shuffle?oldid=115018#C (Year: 2022).*

* cited by examiner

*Primary Examiner* — Philip J Chea
*Assistant Examiner* — Sangseok Park
(74) *Attorney, Agent, or Firm* — McCoy Russell LLP

(57) ABSTRACT

A computer-implemented method can include: a computer program file open request providing read access to text or binary plaintext file data residing on a data storage means; processing the plaintext file data in an input data buffer area following a computer program file data read operation to improve performance by creating a multiplicity of processing threads to perform concurrent, usually non-overlapping encryption processing operations; and an encryption program constructing a previously constructed complex of Pseudo Random Number Generator (PRNG) means to provide on-demand Pseudo Random Number (PRN) values.

15 Claims, No Drawings

ALIGNED HIGH PERFORMANCE DATA ENCRYPTION METHOD

CROSS-REFERENCE TO RELATED APPLICATION

The present application claims priority to U.S. Provisional Application No. 63/364,104, entitled "ALIGNED HIGH PERFORMANCE DATA ENCRYPTION METHOD", and filed on May 3, 2022. The entire contents of the above-listed application are hereby incorporated by reference for all purposes.

BACKGROUND AND SUMMARY

Computing systems have a multiplicity of components. One of them is a memory that provides computing system processors with program instructions and associated data the processors reference to produce logical results or purposes. Memory data that computer systems programs access is usually designed in ways that allow underlying electronic circuitry to exhibit improved data access performance and data movement capability when well-known considerations are observed in programming software.

For example, one common computer memory organization groups data bits into 8-bit units commonly known as "bytes". This organization scheme allows processors to access 8 data-bit groups with a single group reference. Note that an 8-bit byte has four sequential high-order bits and four sequential low-order bits that practitioners skilled in the art often refer to as the byte's two "nibbles". Each such nibble has two adjacent bit-pairs, for a total of four bits in each nibble.

Practitioners skilled in the art refer to successive 8-bit bytes as being "byte-aligned". Similarly, practitioners skilled in the art also often refer to successive 32-bit units as "words" that are "word-aligned". Other memory organizations with similar alignment references are widespread within the art.

Aligned data processing methods can provide significant performance improvements over unaligned data processing. Byte-aligned and word-aligned computing operations typically exhibit higher performance than non-aligned operations because non-aligned processing requires processors to first retrieve encompassing aligned data and then extract desired non-aligned data for processing.

This second extraction step usually impacts overall performance adversely, often at the fundamental circuit level. Finally, practitioners skilled in the art will appreciate that computer caching means usually improve when programming access proceeds with high rates of alignment along specific boundaries specifically suited to the hierarchic caching means, including cache line size alignment.

In particular, data encryption and decryption processes involve significant data processing that can benefit from high degrees of data alignment. This invention reveals an methodology that significantly improves data encryption and decryption performance by maintaining high degrees of data alignment. It references the C programming language and Linux operating system as an example, but non-limiting, embodiment means.

With the C programming language and Linux operating system, a preliminary beneficial C programing step is to ensure all input source file data is available within an optimally-aligned memory buffer that may also benefit by being page fixed. A suitably large C language malloc( ) or calloc( ) memory request or global buffer variable allocation provides an input data memory buffer that usually has excellent data alignment characteristics. It is to be understood that optimum input data buffer alignment at the fundamental hardware level may require the input buffer to have page-fixed, memory page alignment, requiring additional programming measures that are well-understood by practitioners skilled in the art.

DETAILED DESCRIPTION

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like.

Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that may be accessed by a computing device. By way of example, and not limitation, computer-readable media may comprise computer storage media and communication media.

Data Encryption Considerations

For discussion simplicity, following example data encryption discussion assumes an entire plaintext input file can be read into, and reside in, memory for data encryption processing. Specifically, it assumes one C language fread( ) operation can read an entire plaintext file into a single, suitably-aligned memory buffer. When this is not possible, other means should be used that are widely known by practitioners skilled in the art.

A C language fopen( ) read request provides read access to binary plaintext file data residing on a data storage means. An immediate subsequent setvbuf( ) request using the _IONBF parameter can significantly improve IO read performance by eliminating unnecessary buffering data movement for read operations.

In general, the C language fread( ) function enables programming logic to reduce the number of required C language fread( ) read requests by allowing fewer, but larger, file read requests. In practice, single C language fread( ) requests can potentially read an entire plaintext file into an existing memory buffer area a previous malloc( ) request provided. However created or otherwise identified, this buffer area should ideally provide natural, optimum alignment for the first byte read using a fread( ) operation.

When processing the plaintext input data in an input data buffer area following a fread( ) operation, a C program can significantly improve performance by creating a multiplicity of processing threads to perform concurrent, usually non-overlapping encryption processing operations. Each thread is given a multiplicity of unique, aligned fractions of the input plaintext file residing in a buffer. Optimally, thread processing assignments are non-overlapping and collectively exhaustive, each beginning on an aligned boundary.

After creation, threads can optionally assign themselves a processor core affinity if the hardware and software capability exists. In this approach, minimum thread processing contention occurs when each thread executes on its own, separate processor core.

As an embodiment example, the size of an individual plaintext fraction assigned to a thread can be determined by dividing the input plaintext file size by 4, 8, or by a multiple of the processor cache-line size. An alternative example approach is to divide the size of the plain text by the plaintext by a suitable number, such as the number of desired encryption threads, and perform a Boolean AND operation to zero low-order bits of the quotient value to generate a buffer size that ensures suitable alignment of all fractions. For aligned access processing, a plaintext fractionation operation should naturally align each thread's assigned input data to an appropriately aligned buffer area, potentially resulting in the last input file fraction being slightly larger than other fractions.

For processing, an encryption program now constructs, or otherwise references, a previously constructed complex of Pseudo Random Number Generator (PRNG) means to provide on-demand Pseudo Random Number (PRN) values. To prevent race condition interference, unless otherwise precluded using different means, each encrypting thread receives a dedicated, non-shared fraction of the PRNG complex. In an example embodiment, the PRNG provides multibyte PRN values such as 2-byte or 4-byte values to facilitate aligned, multi-byte input data single operation processing encryption process acceleration.

A program thread uses an on-demand stream of PRNs for high-performance, highly-aligned encryption operations. One example encryption embodiment uses PRNs as Vernam Cipher encryption Boolean XOR values. Another example embodiment example uses PRNs as addend values for a modified Caesar Cipher variant where the PRN value is byte-wise arithmetically added to plaintext byte values and overflow.

It is to be understood that the example Vernam and Caesar ciphers should not be regarded as a method limitation, restriction, or constraint. Many other widely appreciated encryption methods are possible.

In addition, when a multiplicity of plaintext bytes are simultaneously encrypted, it can be advantageous to perform a subsequent circular rotation of the encrypted value before returning the result to ciphertext buffer memory. This immediate operation can eliminate the byte alignment that existed for the bytes when the bytes initially existed in plaintext buffer memory. This can also eliminate a subsequent memory reference to perform this operation that adversely reduces performance. The number of bits in the circular rotation can be determined using, at least in part, a PRN.

It is also to be understood that multibyte PRN values allow processing multiple input plaintext values during one well-aligned processing operation, thereby significantly improving performance. When observing such alignment considerations, a method can also consider cache hierarchy operation efficiency and cache line size during multi-threaded processing.

In addition to multi-byte, highly aligned processing, an encrypting program can perform additional processing of any nature, benefitting from the ability to process its multiplicity of fragments using the still-available multi-thread means.

For example, each encryption thread can regard an assigned plaintext fragment or partially encrypted fragment as a simple, bit sequence, independent of other fragments. Starting at the first bit in the bit sequence, a thread can shuffle the starting source bit value with a target bit value elsewhere within the fragment bit sequence and then advance to the next fragment bit towards the fragment ending bit for similar processing until all fragment bits have been so processed. It is to be understood that the byte values presented for processing may have been previously encrypted. Therefore, they may not benefit from a subsequent encryption process and may only benefit from the scrambling process described below.

Using dynamically generated PRN values can, at least in part, independently identify each target bit's offset value. As a simple embodiment example, the Fischer-Yates shuffle algorithm, widely known to practitioners skilled in the art, can provide an example shuffling method. It is to be understood that similar processing can also begin with the ending bit and progress towards the first bit. Practitioners skilled in the art appreciate many other bit shuffling and positional bit swapping methods exist that are included in the scope of this invention.

Moreover, it is also to be understood that this shuffling process can use entire bytes, groups of bytes, four-bit nibble units, or two-bit bit-pairs as shuffling units rather than individual bits. These alternatives, and similar ones, can exhibit beneficially reduced processing improvements at the expense of random shuffling thoroughness.

When the multiplicity of threads have completed processing their respective fragments and terminate, the encryption phase is complete, allowing the original C program to commence optional ciphertext output scrambling.

Optional Ciphertext Output Scrambling

The now encrypted plaintext data, referred to as the ciphertext, is divided into non-overlapping portions that are usually mutually exclusive and collectively exhaustive. The size of any portion can vary from other portion sizes and can be determined by adding a small, divisible-by-4 (as a non-limiting embodiment example) PRN value to an aligned base value, thereby producing an aligned pseudo randomized final size that naturally allows suitable alignment for the next adjacent portion.

The final ciphertext output order of the aligned encrypted portions is determined by sorting the indexes of the several ciphertext portions. A Fischer-Yates sort provides a suitable means as an example sorting embodiment means, though many other shuffling and position swapping means exist.

A C language fopen( ) write file request provides access to storage means to store the encrypted ciphertext as a file. An immediate subsequent setvbuf( ) request using the _IONBF parameter improves TO write performance by eliminating unnecessary buffering data movement for large write operations.

The collective, individual fwrite( ) invocations, in sorted order for each encrypted portion, writes the entire file to the storage means in an out-of-order, scrambled sequence determined in the Optional Ciphertext Output Scrambling step. The optional scrambling significantly decreases the probability of success of unauthorized attempts to decrypt (crack) the ciphertext since the ciphertext file sequence is obfuscated.

Note that it is possible to increase final ciphertext output complexity by prepending a PRN number of extraneous PRN values to each ciphertext portion during the multiplicity of portion write operations. The last written ciphertext portion would beneficially have a pseudo random number of pseudo random number values appended to it.

The prepend and appending operations necessarily increase ciphertext size as compared to the plaintext size. It is to be understood, a multiplicity of random bit values could similarly be inserted or otherwise blended within ciphertext fragments or portions under pseudo random number control, thereby further obfuscating the ciphertext.

Programming logic should issue an fclose( ) for both the plaintext input file and the encrypted ciphertext output file before the program completes execution.

Data Encryption Considerations

The data decryption process constructs the same PRNG the encryption process constructed and exercises it in the same manner, thereby obtaining the same PRN values in the same sequence order.

Using similar fopen( ) and setvbuf( ) procedures, it reads the ciphertext file by identifying the size and order of the encrypted portions, eliminates any inserted, prepended, or appended extraneous random values and individually places the fragments into non-contiguous input buffer areas. This process unscrambles the portions and reassembles them seamlessly in the correct ciphertext order for decryption operations that produce the original plaintext data values.

Programming logic then decrypts the reconstructed, in-order ciphertext by reversing the encryption steps, using the PRN output values in reverse order. In cases where data value encryption involved Caesar Cipher operations, the decryption method would use the twos complement of the associated PRN.

Program logic should using similar fopen( ) and setvbuf ( ) procedures to write the recovered plaintext data and close all open files before the decryption program terminates.

It will be appreciated that variants of the above-disclosed and other features and functions, or alternatives thereof, may be combined into many other different systems or applications.

Various presently unforeseen or unanticipated alternatives, modifications, variations, or improvements therein may be subsequently made by those skilled in the art which are also intended to be encompassed by the following claims.

The invention claimed is:

1. A computer-implemented method comprising:
a computer program file open request providing read access to text or binary plaintext file data residing on a data storage means;
processing the plaintext file data in an input data buffer area following a computer program file data read operation to improve performance by creating a multiplicity of processing threads to perform concurrent, usually non-overlapping encryption processing operations;
an encryption program constructing a previously constructed complex of Pseudo Random Number Generator (PRNG) means to provide on-demand Pseudo Random Number (PRN) values;
when the multiplicity of threads have completed processing their respective fragments and terminate, the encryption phase is complete, allowing the original C program to commence optional ciphertext output scrambling; and
dividing the now encrypted plaintext data, referred to as the ciphertext, into non-overlapping portions that are usually mutually exclusive and collectively exhaustive, wherein the size of any portion can vary from other portion sizes and can be determined by adding a small, divisible-by-4 PRN value to an aligned base value, thereby producing an aligned pseudo randomized final size that naturally allows suitable alignment for the next adjacent portion.

2. The computer-implemented method of claim 1, further comprising determining the final ciphertext output order of the aligned encrypted portions by sorting the indexes of the several ciphertext portions.

3. The computer-implemented method of claim 2, further comprising a C language fopen( ) write file request providing access to the storage means to store the encrypted ciphertext as a file.

4. A computer-implemented method for encrypting data residing in an input data buffer in computer memory, the computer-implemented method comprising:
utilizing a Pseudorandom Number Generation means to encrypt input data that has been brought to a remembered state;
providing the initial processing thread with access to an input data buffer in computer memory that requires encryption, the input data buffer being characterized by a computer memory position and an input data buffer length;
placing unencrypted input plaintext data in the input data buffer for encryption;
identifying a first data segment length and location within the input data buffer and a second data segment length and location within the input data buffer;
having the initial processing thread create a multiplicity of encryption processing threads in a manner allowing a first thread to identify the first segment computer memory location, the first segment's length, and a first dedicated, non-shared fraction of a Pseudorandom Number Generation means and allowing a second thread to identify the second segment computer memory location, the second segment's length, and a second dedicated, non-shared fraction of a pseudorandom Number Generation means;
having the first thread encrypt the first input data buffer segment using output from the first dedicated, non-shared fraction of a Pseudorandom Number Generation means as encryption operation identification or operation operand parameter input as the second thread concurrently encrypts the second data segment using output from the second dedicated, non-shared fraction of a Pseudorandom Number Generation means as encryption operation identification or operation operand parameter input; and
having the first thread optionally shuffle data values in the first input data buffer segment using output from the first dedicated, non-shared fraction of a Pseudorandom Number Generation means as shuffling parameter input as the second thread optionally shuffles data concurrently in the second data segment using output from the second dedicated, non-shared fraction of a Pseudorandom Number Generation means as shuffling parameter input.

5. The computer-implemented method of claim 4, further comprising using an immediate subsequent setvbuf( ) request for fopen( ) file open requests that uses an _IONBF parameter to significantly improve IO read performance by eliminating unnecessary buffering data movement for read operations.

6. The computer-implemented method of claim 4, further comprising threads assigning themselves a processor core affinity if the hardware and software capability exists.

7. The computer-implemented method of claim 4, further comprising, when a multiplicity of plaintext bytes are simultaneously encrypted, performing a subsequent circular rotation of the encrypted value before returning the result to ciphertext buffer memory.

8. The computer-implemented method of claim 7, wherein the number of bits in the circular rotation can be determined using, at least in part, a PRN.

9. The computer-implemented method of claim 4, wherein each encryption thread can regard an assigned plaintext fragment or partially encrypted fragment as a simple, bit sequence, independent of other fragments.

10. The computer-implemented method of claim 9, further comprising, starting at the first bit in the bit sequence, a thread shuffling the starting source bit value with a target bit value elsewhere within the fragment bit sequence and then advancing to the next fragment bit towards the fragment ending bit for similar processing until all fragment bits have been so processed.

11. The computer-implemented method of claim 10, wherein the shuffling process can use entire bytes, groups of bytes, four-bit nibble units, or two-bit bit-pairs as shuffling units rather than individual bits.

12. The computer-implemented method of claim 4, further comprising, when the multiplicity of threads have completed processing their respective fragments and terminate, the encryption phase is complete, allowing the original C program to commence optional ciphertext output scrambling.

13. The computer-implemented method of claim 12, further comprising dividing the now encrypted plaintext data, referred to as the ciphertext, into non-overlapping portions that are usually mutually exclusive and collectively exhaustive.

14. A computer-implemented method for decrypting data residing in an input data buffer in computer memory, the computer-implemented method reversing encryption, shuffling, and scrambling steps comprising:

utilizing an identical Pseudorandom Number Generation means that was used to encrypt the input ciphertext data and has been brought a remembered state before encryption commenced;

providing an initial processing thread to initiate the decryption method;

providing the initial processing thread with access to an input data buffer in computer memory that will hold data to be decrypted, the input data buffer being characterized by a computer memory position and an input data buffer length;

having the initial processing thread place encrypted data into the input data buffer, optionally performing input ciphertext descrambling when necessary to provide unscrambled but optionally shuffled ciphertext in the input data buffer, using output from a dedicated, non-shared fraction of a Pseudorandom Number Generation means as unscrambling parameter input;

having the initial processing thread optionally un-shuffle the unscrambled input ciphertext to provide unscrambled and un-shuffled ciphertext in the input data buffer using output from a dedicated, non-shared fraction of a Pseudorandom Number Generation means as shuffling parameter input;

identifying a first data segment length and location within the input data buffer and a second data segment length and location within the input data buffer;

having the initial processing thread create a multiplicity of decryption processing threads in a manner allowing a first thread to identify the first segment computer memory location, the first segment's length, and a first dedicated, non-shared fraction of a Pseudorandom Number Generation means and allowing the second thread to identify the second segment computer memory location, the second segment's length, and a second dedicated, non-shared fraction of a Pseudorandom Number Generation means;

having each decryption thread optionally un-shuffle the unscrambled input ciphertext in its segment to provide unscrambled and un-shuffled ciphertext in the segment using output from its dedicated, non-shared fraction of a Pseudorandom Number Generation means as shuffling parameter input; and having the first thread decrypt the first input data buffer segment using output from the first dedicated, non-shared fraction of a Pseudorandom Number Generation means as circular rotation values, decryption operation identification, or operation operand parameter input while the second thread concurrently decrypts the second data segment using output from the second dedicated, non-shared fraction of a Pseudorandom Number Generation means as circular rotation values, decryption operation identification, or operation operand parameter input.

15. The computer-implemented method of claim 14, further comprising threads assigning themselves a processor core affinity if the hardware and software capability exists.

* * * * *